United States Patent [19]

Seiler

[11] 4,233,906
[45] Nov. 18, 1980

[54] LINEAR INDUCTION MOTOR WITH IMPROVED RAIL ASSEMBLY

[75] Inventor: Karl H. Seiler, Breitenau, Fed. Rep. of Germany

[73] Assignee: Krauss-Maffei Aktiengesellschaft, Munich, Fed. Rep. of Germany

[21] Appl. No.: 876,735

[22] Filed: Feb. 10, 1978

[30] Foreign Application Priority Data

Feb. 12, 1977 [DE] Fed. Rep. of Germany ....... 2705954

[51] Int. Cl.³ .............................................. E01B 41/02
[52] U.S. Cl. ................... 104/294; 238/122; 310/12
[58] Field of Search ................ 104/148 LM, 148 MS, 104/148 SS; 310/12, 13; 318/38, 135, 687; 238/122, 151, 152

[56] References Cited

U.S. PATENT DOCUMENTS

| | | | |
|---|---|---|---|
| 3,616,763 | 11/1971 | Colling et al. ............... | 104/148 LM |
| 3,667,397 | 6/1972 | Haynes ........................ | 104/148 LM |
| 3,667,398 | 6/1972 | English ........................ | 104/148 LM |
| 3,729,135 | 4/1973 | Frasure ..................... | 104/148 LM X |
| 3,820,472 | 6/1974 | Schwarzler .................. | 104/148 LM |
| 3,824,414 | 7/1974 | Laithwaite et al. ..... | 104/148 LM X |

FOREIGN PATENT DOCUMENTS

940490  12/1948  France ...................... 238/151

*Primary Examiner*—Randolph A. Reese
*Attorney, Agent, or Firm*—Karl F. Ross

[57] ABSTRACT

A linear induction motor, particularly for a vehicle traveling along an extended track, has an armature or reaction rail mounted on the track and a stator carried by the vehicle and juxtaposed with the rail. The rail is of a highly conductive material and is provided in lengths or sections which overlap by approximately a pole length of the stator. The overlapping ends form an induction gap for energy transfer between the rail sections.

3 Claims, 6 Drawing Figures

LINEAR INDUCTION MOTOR WITH IMPROVED RAIL ASSEMBLY

FIELD OF THE INVENTION

The present invention relates to a linear induction motor and, more particularly, to an improved reaction or armature rail assembly for a linear induction motor.

BACKGROUND OF THE INVENTION

In U.S. Pat. Nos. 3,820,472; 3,967,561 and 4,027,597, for example, linear induction motors are described which comprise a stator or primary member, complete with windings and pole pieces, and a secondary part, such as an armature or reaction rail of high conductivity in which eddy currents are generated to electromagnetically react with the field of the primary part and generate a force tending to displace one of the parts relative to the other.

When such systems are provided in vehicles, e.g. air-cushion or magnetically-suspended vehicles, they constitute a particularly efficient and compact propulsion source for driving a vehicle along a track. The vehicle may carry the primary part or stator and the track may be formed with the rail and can be constituted as a concrete structure along which the rail extends.

For such asynchronous linear induction motors (LIM) the rail is normally constituted of a material having high electrical conductivity, preferably aluminum.

Because of the different coefficients of thermal expansion of the reinforced concrete track and the metal reaction or armature rail attached thereto, the LIM rail cannot be continuous, i.e. the end of one sectional length of the rail cannot be contiguously and rigidly connected to the opposite end of the next rail section or length.

Between the proximal ends of successive rail sections or lengths, therefore, it is necessary to provide expansion gaps to permit the yielding of one LIM rail section relative to the other.

However, at these expansion gaps, the current-flow patterns induced in the LIM rail by the primary part or stator of the LIM are disturbed or distorted which results in a discontinuity in the vehicle-propulsion force at such gaps.

In addition, when the vehicle is traveling at relatively low speeds, i.e. when there is a slow relative speed between the primary and secondary parts of the linear induction motor, especially during start-up, a temperature increase is manifested at the expansion gap because of an increased concentration at the boundary edges thereof of the induced current. This temperature increase can be sufficient to cause fusion or melting of the rail materials at this gap and hence disruption of the operation of the system.

The problem has been recognized heretofore and there have been various attempts at solution. For example, it has been proposed to provide a galvanic connection between the two rail ends at an expansion gap via a flexible electrical conductor. While this system affords a better distribution of the electrical current than is the case where the gap is not spanned by a conductor, it is not entirely satisfactory because the flexible connector is of relatively high cost, can be mounted only at considerable expense, tends to increase the spacing which must be provided between the rail section faces and the juxtaposed pole faces of the stator, and is susceptible to deformation by the forces corresponding to the induced currents. In fact, the flexible connectors are frequently torn away by such forces and interfere with proper operation of the linear induction motor.

Apart from this, the system does not adequately provide for maintenance of the propulsion force across the expansion gap.

OBJECTS OF THE INVENTION

It is the principal object of the present invention to provide a rail arrangement for the aforedescribed purposes which, at low cost, can include means for maintaining the propulsion force across an expansion gap, the latter means occupying a minimum of space and avoiding the disadvantages of the earlier systems enumerated above.

Yet another object of the invention is to provide a linear induction motor in which a stator or primary part is displaceable along a reaction or armature rail which is subdivided into spaced-apart sections or lengths by expansion gaps which can be made at low cost are capable of sustaining the propulsion force as the magnetic field generated by the primary part sweeps across this gap.

Still another object of the invention is to provide an improved vehicle system propelled by a linear induction motor having an improved rail structure obviating the disadvantages enumerated above.

SUMMARY OF THE INVENTION

These objects and others which will become apparent hereinafter are attained, in accordance with the present invention, in a rail system for the aforedescribed purposes in which the armature or reaction rail is mounted upon a support, constituting the track of the vehicle, and comprises a plurality of successive rail sections or lengths, the proximal ends of which are disposed so as to form an expansion or contraction gap, i.e. approach one another such that they do not abut directly in the region of this gap, thereby allowing thermal expansion and contraction of the adjoining lengths independently of one another. According to the invention, the ends of the adjoining lengths overlap over a length approximately equal to one pole length of the motor and between the overlapping ends there is provided an induction gap or spacing dimensioned to permit energy transfer from one length or section to the next length or section.

The construction in the overlap region can be of various configurations, depending upon convenience and the desired effect. For example, the overlapping ends can have the same thicknesses as the remainder of the rail sections but can be offset with respect to one another, i.e. one rail section can be disposed over the other. The two rail sections may alternatively be substantially coplanar over the major portions of their lengths and can have the upper and lower broad surfaces lying in respective length, the overlapping ends being cut away so as to lie one beneath the other. In this case, the thickness of each of these ends may be somewhat less than half the thickness of the rail section elsewhere along its length.

In yet another embodiment of the invention, the overlap is effected by an intermediate rail member which can overlap portions of the length of each of two main rail sections. In either case, the induction gap may be an airgap or may be filled with an insulating material such as paper or an insulating lacquer.

The present invention thus provides a contactless yieldable junction between two rail sections which nevertheless permits inductive current transfer between the neighboring ends of the rail sections. This applies whether the induction gap is filled with air or with another insulating medium such as the lacquer or paper mentioned previously. It is preferred to use a lacquer or paper of this type because the insulating medium then provides a barrier to fusion of the rail parts together.

The system has all of the advantages described above and none of the disadvantages enumerated. For example, there is no danger that the connection between the rail sections will distort or be damaged by forces generated by the electromagnetic fields, nor is the connection between the rail sections expensive to fabricate or assemble. It does not take up excessive space.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 5:
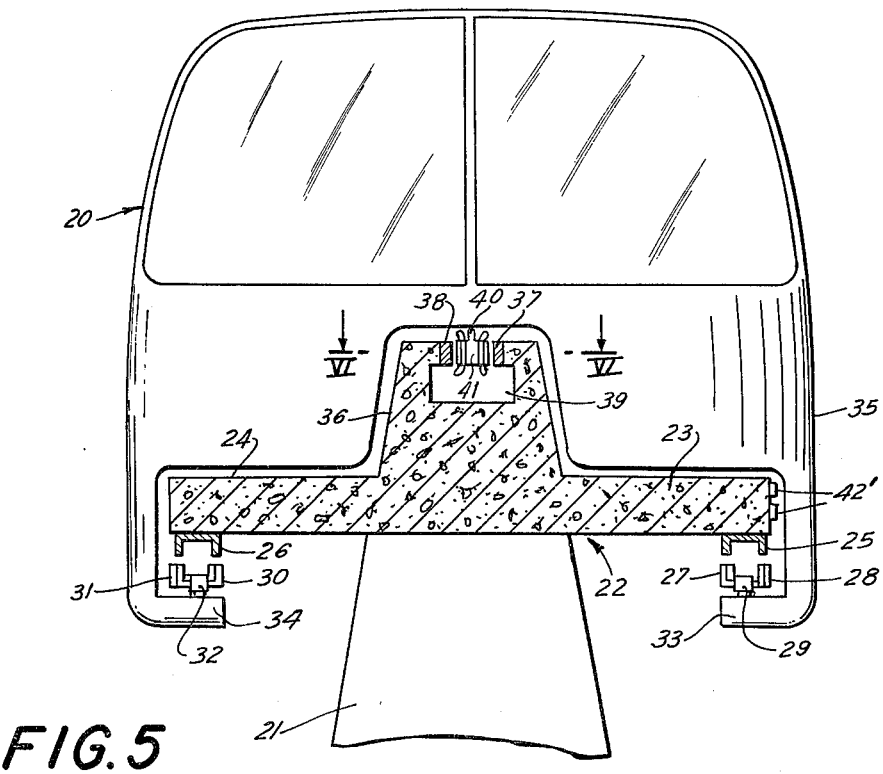
FIG. 5 is a vertical cross-section through a track provided with two rails, each composed of a plurality of rail sections having such junctions.

Referring first to FIG. 5, it will be seen that a vehicle system having the improved rail assembly of the present invention can comprise, as described for example in U.S. Pat. No. 3,820,472, a vehicle 20 adapted to travel along a track 22 supported on horizontally spaced posts or pylons 21 and composed of concrete. The track 22 has a pair of lateral wings 23 and 24 upon the outer ends of which are mounted downwardly turned U-shaped bars 25 and 26 forming armatures for a magnetic suspension and guidance system carried by the vehicle. More particularly, the vehicle 20 has a cab 35 with downwardly extending aprons whose inwardly turned ledges 33 and 34 each carry electromagnets 27 and 30 consisting of pole pieces 28 and 31 and electromagnet coils 29 and 32. In the manner described in U.S. Pat. No. 3,820,472, the electromagnetic suspension system supports the vehicle with clearance upon the track as it travels (perpendicular to the plane of the paper in FIG. 5) along the track.

The track also is provided with rails 42' which are connected to a source of electric current, picked up by wipers or shoes (not shown) on the vehicle and providing current for the linear induction motor and the suspension electromagnets.

The linear induction motor 41 comprises the primary part or stator which is affixed centrally at 40 to the vehicle and is of the two-sided type, the LIM 41 being confronted on each side by a respective reaction rail 37 and 38 mounted upon an upstanding ridge 36 of the track, the latter having a central cavity 39.

Figure 6:
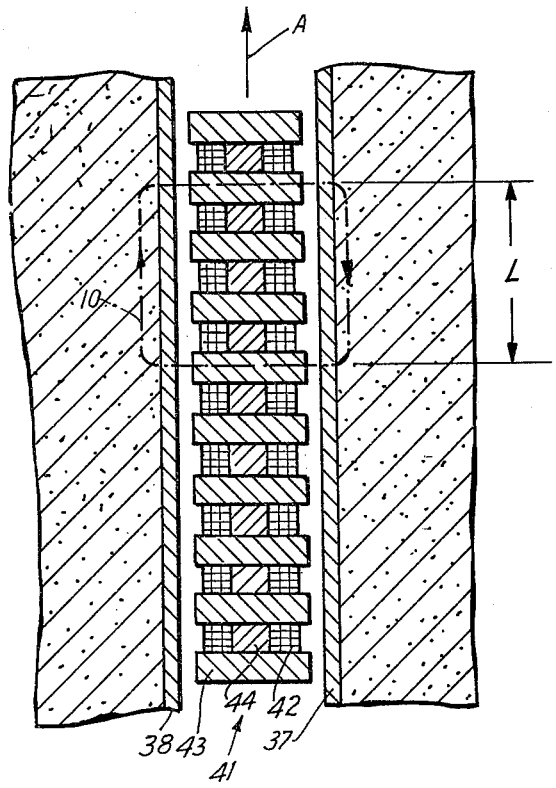
FIG. 6 is a section taken along the line VI—VI of FIG. 5 but drawn to an enlarged scale.

If a reference is made now to FIG. 6 it will be apparent that the stator can comprise a plurality of windings 42 between pole pieces 43 and surrounding core pieces 44, the entire system having an effective pole length L.

The LIM 41 propels the vehicle in the directon of arrow A. In this embodiment, two rails 37 and 38 flank the stator.

The rails 37 and 38 each consist of a multiplicity of long rail sections 1 and 2 (see FIGS. 1–4) which adjoin the respective expansion zones so as to permit thermal expansion of each of the rail sections individually.

In the embodiments of FIGS. 1–4, the ends of the adjoining rail sections overlap over the length L corresponding to a pole length of the stator or primary part of the LIM.

Figure 2:
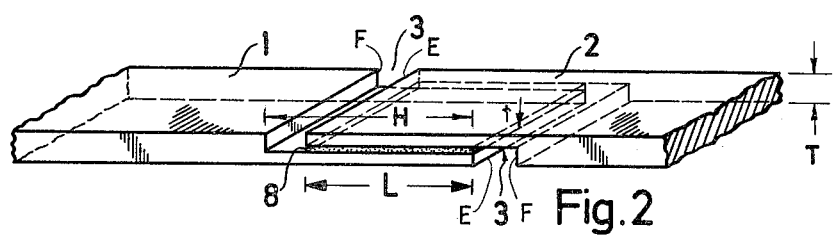
Figure 3:
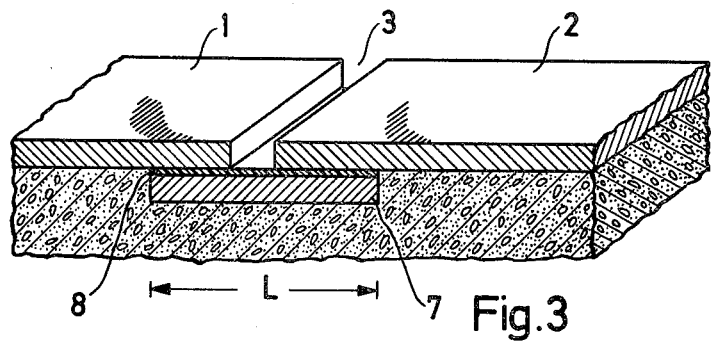

The overlapping can be effected either by the main rail sections or lengths themselves (FIGS. 1, 2 and 4) or through a separate or intermediate rail section 7 (FIG. 3). In either case, the overlapping is effected such that an induction gap is provided over the length L of overlap. This induction gap is either air-filled (FIG. 4) or is filled with an insulated medium 8 which can be insulating lacquer, insulating paper or the like. The principle of operation will be apparent from FIG. 1. Each of the ends of the main rail sections 1 and 2 can thermally expand or contract in the direction of arrow B. The principle of operation of the junction will be apparent from FIG. 1 in which the eddy current is shown at C somewhat diagrammatically while the magnetic field is perpendicular to the plane of the first section 1 as represented by the arrow D. Energy transfer thus is effected by induction across the gap G (induction gap) without direct contact of the rail members 1 and 2.

Figure 1:
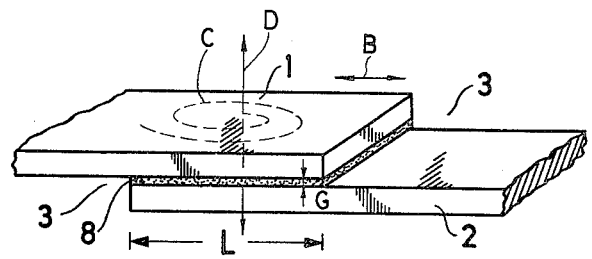
FIGS. 1–4 are perspective views, generally in section and partly in diagrammatic form, of rail junctions according to the invention.

The successive rail sections 1, 2, etc. in the embodiment of FIG. 1 are alternately set up and down, i.e. are offset so that the thicknesses of the overlapping ends can be equal to the thicknesses of the remainder of the rail sections 1 and 2. The insulating medium 8 extends over the entire length L of the overlap region.

In the embodiment of FIG. 2, the ends of the rail sections 1 and 2 are stepped so that the thickness t of the overlapping end portions is less than half the thickness T of the remainder of the rail. This permits the upper and lower faces of the two rails to lie in common planes even in the overlap region. The lengths H of the stepped portions exceeds the length L to provide the expansion gaps 3 between the end faces F of the steps and the faces E at the extreme ends of each of the rail sections. The insulating medium 8 extends only over the length L.

In the embodiment of FIG. 3, the opposite ends of the rail sections 1 and 2 are bridged by an intermediate rail section 7 which is overlapped by each of the main rail sections 1 and 2 which define the expansion gap 3 between them. The induction gap is in each case filled with the insulating medium 8. The length of the bridging rail section 8 corresponds again to one pole length of the linear motor.

Figure 4:
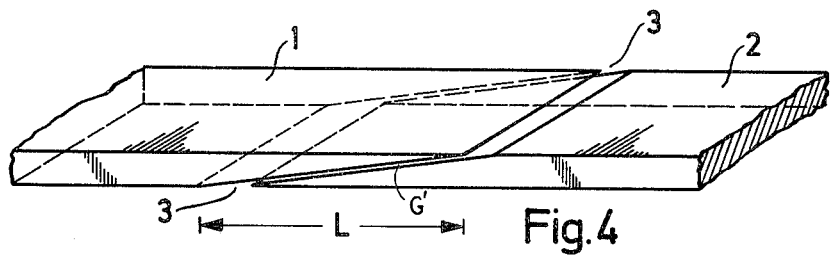

In the embodiment of FIG. 4, the ends of the rail sections 1 and 2 are complementarily tapered, i.e. of a wedge shape to define an air-filled induction gap G' of constant thickness. The projection L of the inclined surfaces upon the rail plane corresponds again to one pole length of the linear motor. The expansion region is here again designated by the reference numeral 3.

I claim:

1. In combination with a linear induction motor having a current-induced primary part having a pole length and an electrically conductive reaction rail composed of a multiplicity of successive rail sections, the improvement which comprises an expansion junction between successive rail sections whereby the successive rail sections are one-piece flat elongated plates of constant cross section over their entire lengths and are in inductive energy-transferring relationship with one another but out of direct electrical or mechanical contact and are capable of relative thermal expansion and contraction movement, two main rail sections at each junction have their ends juxtaposed with one another across an air-filled expansion gap and each overlaps in the direction of travel a flat intermediate rail section of the same width and defines a respective induction gap therewith, said induction gap being filled with a solid insulating medium, said intermediate rail section bridging the expansion gap, the length of said rail section corresponding approximately to said pole length.

2. The combination defined in claim 1 wherein said solid insulating medium is an insulting lacquer.

3. The combination defined in claim 1 wherein said solid insulating medium is an insulating paper.

* * * * *